Figure 5:
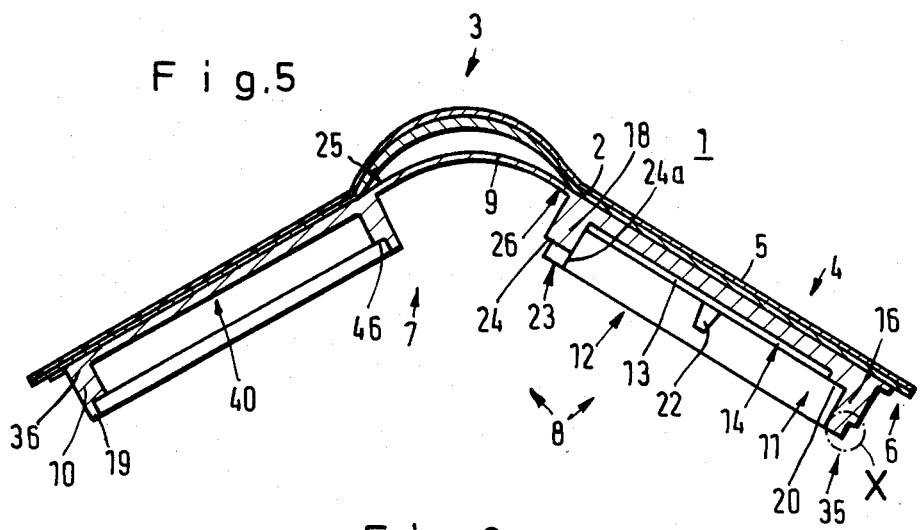

United States Patent [19]

Burgschweiger

[11] Patent Number: 4,724,957

[45] Date of Patent: Feb. 16, 1988

[54] CONTAINER

[76] Inventor: Otto Burgschweiger, Bei den Kämpen 11 c, 2105 Seevetal, Fed. Rep. of Germany

[21] Appl. No.: 918,392

[22] PCT Filed: Nov. 15, 1983

[86] PCT No.: PCT/DE83/00191

§ 371 Date: Jul. 9, 1984

§ 102(e) Date: Jul. 9, 1984

[87] PCT Pub. No.: WO84/02029

PCT Pub. Date: May 24, 1984

Related U.S. Application Data

[63] Continuation of Ser. No. 631,554, Jul. 9, 1984, abandoned.

[30] Foreign Application Priority Data

Nov. 16, 1982 [DE] Fed. Rep. of Germany ....... 3242296

[51] Int. Cl.⁴ .................... B65D 85/57; B65D 85/672
[52] U.S. Cl. .................................. 206/309; 206/311; 206/387; 206/472; 281/31
[58] Field of Search ............... 206/311, 387, 432, 472, 206/309; 220/339; 229/2.5 R; 281/29, 30, 31, 35-37; 402/3

[56] References Cited

U.S. PATENT DOCUMENTS

| | | |
|---|---|---|
| 2,643,899 | 6/1953 | Cavalero . |
| 3,195,924 | 7/1965 | Carter . |
| 3,199,895 | 8/1965 | Tullio ..................... 281/29 |
| 3,262,454 | 7/1966 | Shillinger ............... 281/29 |
| 3,503,141 | 3/1970 | Schwartz ................ 281/31 |
| 3,640,379 | 2/1972 | Weingarden ........... 206/387 |
| 3,743,081 | 7/1973 | Roberg . |
| 4,085,845 | 4/1978 | Perfect .................. 206/564 |
| 4,255,872 | 3/1981 | Williams ................ 206/387 |
| 4,289,235 | 9/1981 | Egly . |
| 4,294,558 | 10/1981 | Errichiello ............ 220/339 |
| 4,385,688 | 5/1983 | Grant ..................... 206/0.84 |
| 4,407,410 | 10/1983 | Graetz et al. ......... 206/387 |

FOREIGN PATENT DOCUMENTS

| | | |
|---|---|---|
| 519383 | 2/1982 | Australia . |
| 0001353 | 4/1979 | European Pat. Off. . |
| 2749854 | 5/1979 | Fed. Rep. of Germany ........ 281/31 |
| 3027024 | 2/1982 | Fed. Rep. of Germany . |
| 2221784 | 10/1974 | France . |
| 2503667 | 10/1982 | France . |
| 2518297 | 5/1983 | France . |
| 2038164A | 7/1980 | United Kingdom ................. 220/339 |
| 2091692 | 8/1982 | United Kingdom . |
| 2094761 | 9/1982 | United Kingdom . |
| 2101970 | 1/1983 | United Kingdom . |

Primary Examiner—Jimmy G. Foster
Attorney, Agent, or Firm—Andrus, Sceales, Starke & Sawall

[57] ABSTRACT

The invention relates to a method for producing book-like containers for tape-like or disk-like record supports for acoustic and/or optical information, as well as data processing programs, with a book back made from cardboard and a reception part fixed thereto for the record supports and a container produced by this method. From a cardboard blank is initially produced a book cover with a round back part, followed by the production of a foil-lined print covering, which is provided with a system impression and is then connected to the book cover. Then on the first inside of the book cover is fixed a cover member for the reception part formed as a deep-drawn part from polystyrene or the like and on the other inside of the book cover is fixed a base member also made as a deep-drawn part from polystyrene or the like and which is connected with the cover member of the reception part by a preshaped back part. As a result, in the vicinity of the back part, the book cover is not joined therewith.

9 Claims, 10 Drawing Figures

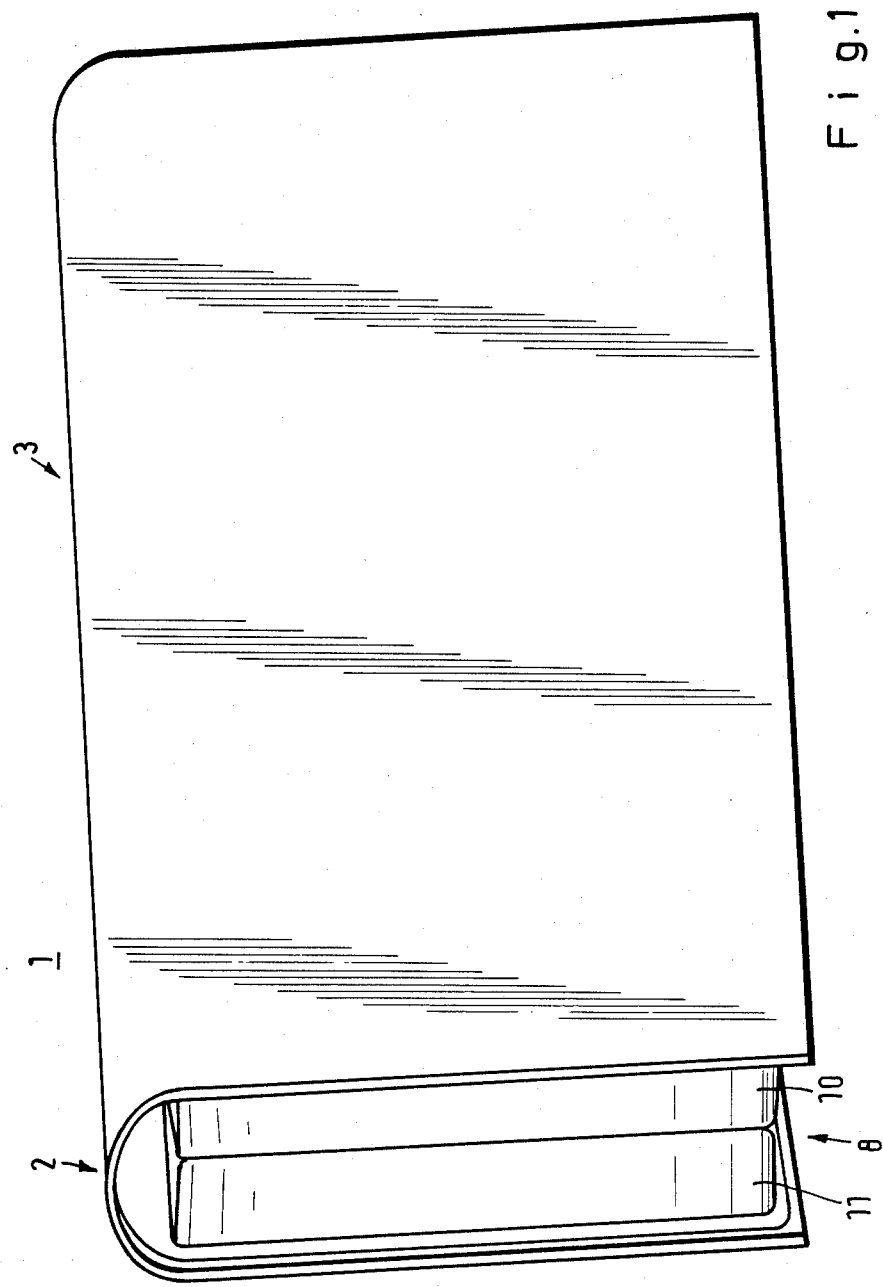

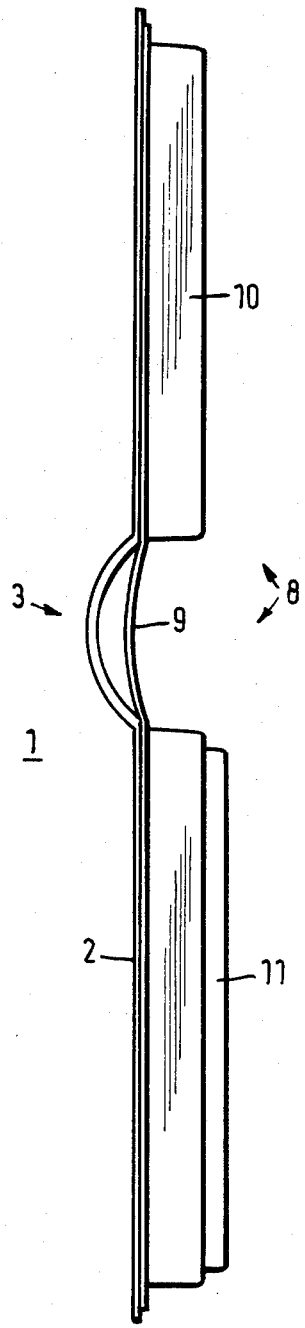
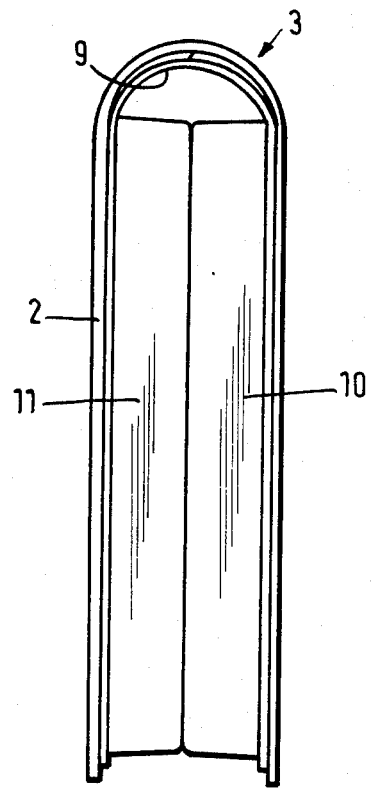
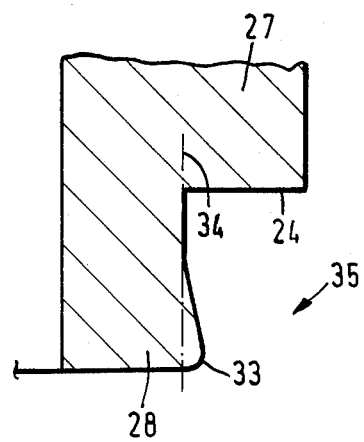

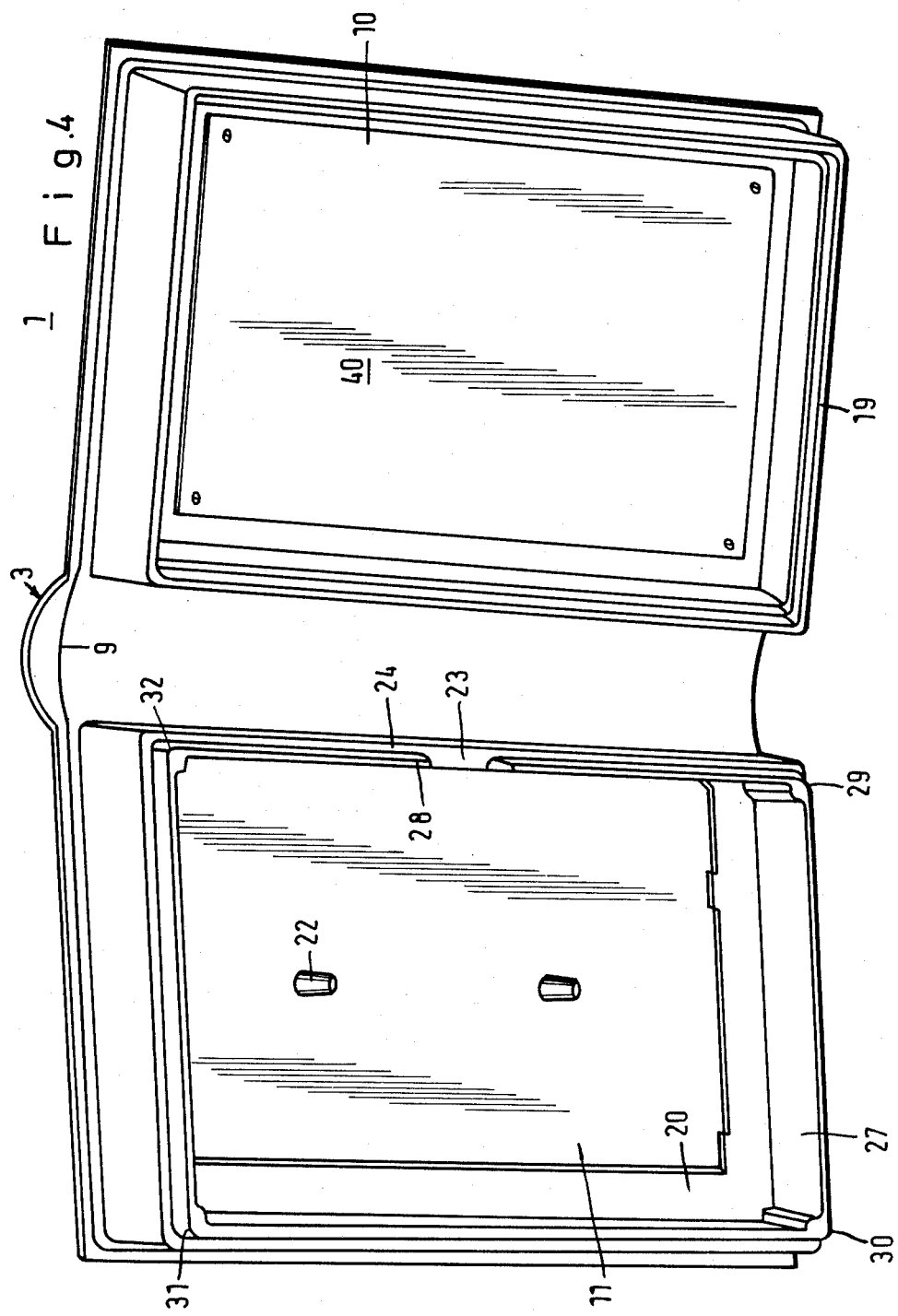

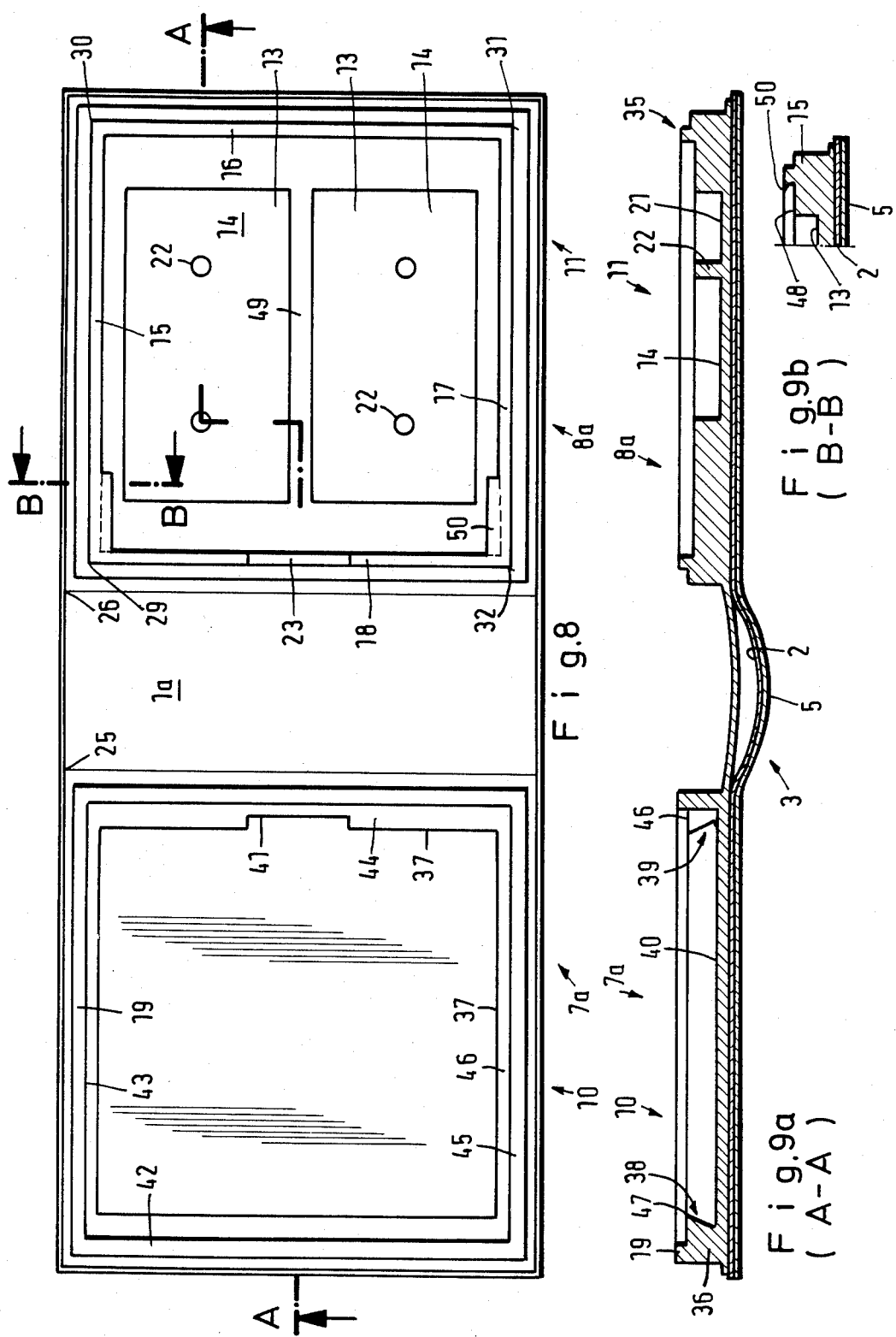

CONTAINER

The present application is a continuation application of U.S. patent application Ser. No. 06/631,554, filed July 9, 1984 and now abandoned.

The invention relates to a method for producing book-like containers for tape-like or disk-like record supports for acoustic and/or optical information, as well as data processing programmes with a book back made from cardboard and a reception part for the record support fixed thereto, as well as to a container produced by this method.

It is known to use box-shaped hinged or folding containers for receiving cassettes, e.g. video cassettes and which have the appearance of a book in the closed state. They are made from flexible PVC foil, which is formed into a hinged container by high frequency welding. A transparent foil is so arranged on the outer surface of the hinged container, that a slide-in pocket is formed from a printed sheet with information on the content of the container. However, these known hinged containers suffer from serious disadvantages. The connection between the container halves is also constituted by a flexible PVC foil, so that the foil portions in the vicinity of the hinges frequently tear or crease after a short period of use under the influence of alternating temperatures. As the hinged containers only have a limited dimensional stability, they deform during use, so that the external appearance is considerably impaired. Another disadvantage is that the insertion of the printed sheets into the slide-in pocket formed by the transparent foil is far from easy. The sharp edges of the hinged container caused by the manufacturing process can easily lead to finger injuries. This danger also exists when using the hinged container. In addition, the printed sheets can be easily removed for unauthorized making of copies.

Another container is known from German Utility Model No. 8,101,267, which is externally formed from a hard paper or cardboard layer, onto which is internally stuck a plastic layer for receiving the cassette. The external hard paper or cardboard layer can be externally provided with a printed layer. The disadvantage of this container is that, during use, as a result of the opening movements of the cardboard and the plastic foil, tearing and creasing can easily occur in the vicinity of the back hinges. In addition, the external cardboard surface can be easily damaged or dirtied by scratches and the like.

The object of the invention is to so construct a container for tape-like or disk-like record supports or holders of the type described hereinbefore, that the disadvantages of known flexible PVC containers are avoided. Whilst obtaining a dimensionally stable book-like character of the container, the record supports are arranged in positionally secure manner and the actual container can be provided with information which cannot be reproduced in a destruction-free manner.

According to the invention, this object is achieved in that a book cover with a round back part is formed from a cardboard blank, then a foil-lined print covering is produced, is given a system overprint and is connected to the book cover, whilst then on the first inside of the book cover, is fixed a cover member for the reception part formed as a deep-drawn member from polystyrene or the like and on the other inside of the book cover is fixed the base member of the reception part which is also in the form of a deep-drawn part made from polystyrene or the like and which is connected to the cover member of the reception part by a preshaped back part, in such a way that the book cover is not connected to the back part in the vicinity thereof.

According to a further feature of the invention, the book cover of the cardboard container is rounded in the back section and is externally fixed to a foil-lined print covering and on the inside is connected to a reception part made in per se known manner from a one or multi-part blank of polystyrene or the like and which comprises a cover member and a base member, in which is formed at least one recess having a reduced bearing surface compared with the opening cross-section, whilst in the vicinity of the back section is provided a resiliently elastically constructed concave connecting section, which is not connected to the back section of the book cover.

Further developments of the invention are described in the subclaims. Embodiments of the invention are represented in the drawings, wherein show:

FIG. 1 a diagrammatic view of a container according to the invention.

FIGS. 2 and 3 the container according to FIG. 1 in side view in open and closed positions.

FIG. 4 a diagrammatic front view of the container in the open position.

FIG. 5 a sectional side view of the container in the open position.

Figure 6:
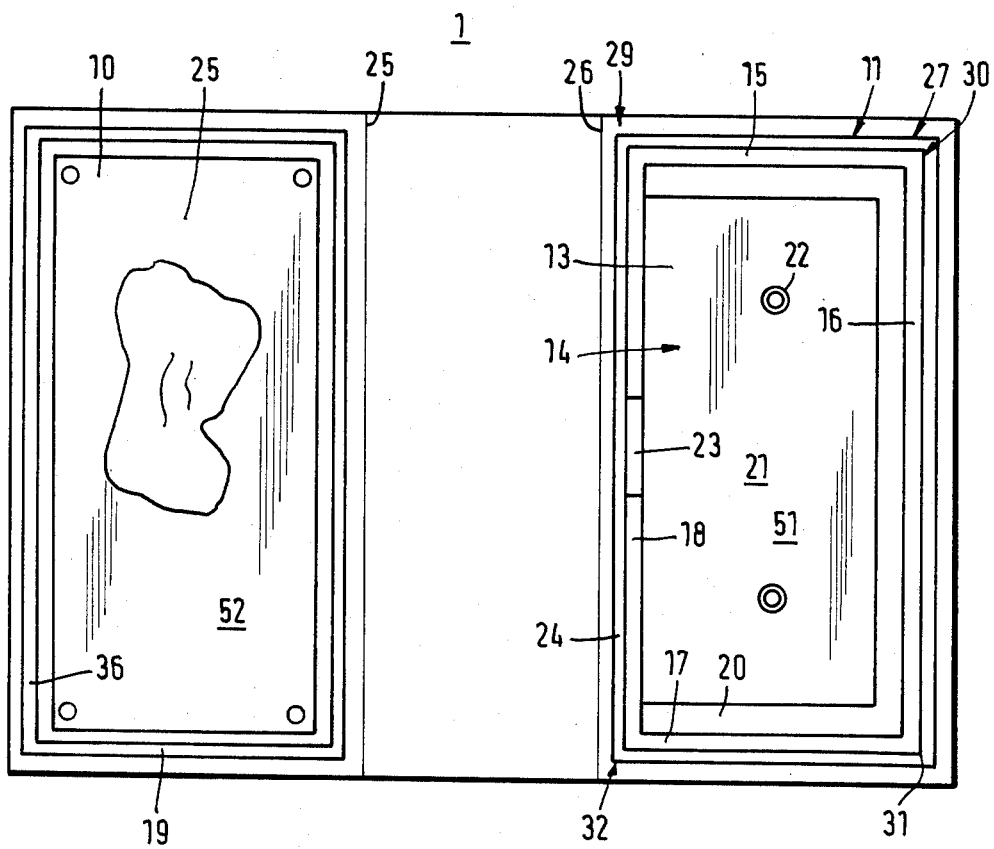

FIG. 6 a front view of the container in the open position.

FIG. 7 a corner section of the base member with a clamping member in a larger scale sectional detail.

FIG. 8 another construction of a container in the open position in a front view.

FIG. 9a a side view along section A—A of the container of FIG. 8.

FIG. 9b a detail in section B—B.

Container 1 comprises a book cover 2 made from cardboard or the like, which is rounded in the back section 3. On side 6 of book cover 2 is provided a reception part 8, which in per se known manner comprises a one-piece blank 7 of polystyrene or the like (FIGS. 1 to 4).

On the outside 4 of book cover 2 a foil-lined print covering 5 is fixed to book cover 2. Print covering 5 is preferably formed from a tear-resistant polypropylene foil, which has directly lined colour prints. For example, different video systems can be identified by metal hot foil blockings (FIGS. 5 and 6).

The reception part 8 is bonded to the book cover 2. In the vicinity of back section 3, a concave connecting section 9 is formed on reception part 8 and is not connected to back section 3. The connecting section 9 is constructed in such a way that it has resilient elastic characteristics and assists the closure of container 1.

For this purpose, additionally the corner sections 29, 30, 31, 32 of the surrounding guidance web 28 of wall 27 formed from marginal webs 15, 16, 17, 18 convexly protrude towards the outer edge of wall 27 by means of thickened material portions 33 (FIG. 7). Portions 33 serve as clamping members 35, which permit a clamp fastening of base member 11 to cover member 10.

The reception part 8 comprises a cover member 10 and a base member 11, between which is arranged the connecting section 9. A recess 14 having a reduced bearing surface 13 compared with the opening cross-section 12 is formed in base member 11. Recess 14 is located on the free outer marginal webs 15, 16, 17 of the base member, accompanied by the formation of a shoulder 20. Two per se known lugs 22 projecting from the bottom surface 21 are formed in recess 14 so as to constitute cassette holders. As a result of the two lugs 22 and recess 14, bottom member 11 is able to securely house both standard cassettes and smaller-sized Betamax cassettes.

A clearance 23 is provided in the marginal web 18 of base member 11 facing back section 3. Clearance 23 extends up to the bearing surface 24 of the wall portion of wall 27 of base member 11 associated with marginal web 18 and serves as a reception aid for the cassette located in base member 11. When the container is closed, clearance 23 is covered by the allround web 19 of cover member 10, so that the cassette in base member 11 is stored in dustproof manner.

The bottom surface 40 of cover member 10 is constructed as a symbol carrier surface. For this purpose, it is possible to insert in an arbitrary manner in the form of a production tool, a plate with raised symbols corresponding to the bottom surface 40, in order that the latter can reproduce different informations.

Externally, container 1 has the true-to-shape character of a book, which can in particular be obtained by an original book cover being used as cover 2. By covering book cover 2 with a directly glossy foil-lined print covering 5 or some comparable material, it is possible to permanently maintain the brightness of the multicolour prints used. The special configuration of clearance 23 in the raised guidance web 24a of marginal web 18, as well as the interengaging all-round edges, constructed as a snap closure, of the all-round web 19 of cover member 10 and the marginal webs 15, 16, 17, 18 of base member 11 permit optimum dust protection and simultaneously protect the cassette located in base member 11 from falling out on opening. The areas of the inner hinges 25, 26 subject to particular mechanical stress are substantially protected against destruction by the rounded connecting section 9. A special advantage of container 1 is that the print covering 5 is fixed to book cover 2 and can only be used with difficulty for reproduction purposes. This forgery security of container 1 is further increased if the foil-lined print covering 5 is identified by a metal hot foil blocking.

FIGS. 8 to 9b show a further container 1a, which is used for the combined reception of magazine-like information carriers, cassettes, and also record supports in disk form. The magazine-like information carrier can be placed on the bottom surface 40 of cover member 10. For retaining purposes, the marginal web portions 42, 44 have thickened portions 47 in the plane of bearing surface 46 and these prevent the magazine-like information carrier from dropping out of cover member 10. In order to be able to remove the information carrier from cover member 10, in the marginal web portion 44 a clearance 41 is formed, which extends over the entire height of the all-round web 19 and up to bottom surface 40. In the vicinity of clearance 41, it is possible to engage under the magazine-like information carrier and to laterally displace the same until it moves past the thickned portion 47 of marginal web portion 44 and can be removed upwards.

Two recesses 14 are formed in base member 11 and their bearing faces 13 carry in each case two lugs 22, which maintain the cassettes in place, each being inserted in one of the recesses 14. Thus, between the latter and the marginal webs 15, 16, 17, 18, is formed an allround mounting face 48, on which can e.g. be placed a disk. The disk is centrally supported by a central web 49 between recesses 14. A retaining member 50 is placed on each of the marginal portions of marginal webs 15, 17 for securing the disk on the all-round mounting face 48. Member 50 is constructed as a thickened material portion projecting over mounting face 48. For mounting the disk on mounting face 48, it is merely necessary to shove the disk under the retaining members 50. The disk can be removed from base member 11 by laterally passing beneath it.

It is also possible to place profile members in the cavities 51, 52 formed by the marginal webs 15, 16, 17, 18 of base member 11 and/or the all-round marginal web 36 of cover member 10 and they then serve to secure the record supports. These profile members can be detachably fixed in the particular cavities 51, 52 by suitable clamping members. As a result of these profile members, it is possible to use a given container for storing record supports having different dimensions.

I claim:

1. A book-like container for tape or disc recording media holders, said container comprising:
   a casing member (2) formed of cardboard, said casing member having a pair of covers connected by a curved spine section (3) and a foil (5) on the side of the casing member that is exterior when the book-like container is closed; and
   a base member reception part (11) mounted on one of said covers for receiving the recording media holder, a cover member reception part (10) mounted on the other of said covers, said reception parts being mounted on the side of said casing member that is interior when the book-like container is closed, said reception parts being formed of a plastic material and being connected by an elastically resilient plastic sheet-like connecting section (9) spanning said spine section (3) of said casing member but unconnected therewith, said connecting section being curved and biasing said container to the closed position, said base member reception part having four walls (15, 16, 17, 18) forming a rectangular peripheral flange defining a recess (14) for receiving the recording media holder, a cut out (23) in the wall (18) of said peripheral flange adjacent said connecting section (9) facilitating removal of the holder from said recess, the remaining three walls (15, 16, 17) of said peripheral flange being stepped to form a shoulder (20) on which the recording media holder rests when received in said recess, the walls (15, 16, 17, 18) of said base member reception part elastically engaging a wall (19) of said cover member reception part (10) forming a peripheral flange on said cover member reception part, the corners of said peripheral flange of said base member reception part having outwardly extending protrusions lying normal to the cover of said casing member on which said base member reception part is mounted, said protrusions (33) formed to engage a substantially smooth surface of said wall (19) of said cover member reception part when the book-like container is in the closed condition for retaining the book-like container in the closed condition.

2. The container according to claim 1 wherein said protrusions of said corners of said peripheral flange convexly protrude toward the outer edge of said flange.

3. The container according to claim 2 wherein said protrusions are formed of a thickened material portion.

4. The container according to claim 1 wherein said peripheral flange of said base member reception part has retaining means (50) on the inner surface of said walls for retaining a holder for a disc-like recording medium.

5. The container according to claim 4 wherein said retaining means comprises lips extending over said shoulder (20) for the detachable retention of a holder for a disc-like recording medium.

6. The container according to claim 1 wherein both said reception parts have recesses and a profile member is detachably inserted in at least one of said recesses for securing the recording media holder.

7. The container according to claim 1 wherein said recess in said base member includes pins (22) for receiving the recording media holder.

8. The container according to claim 1 wherein said wall (19) of said cover member reception part (10) has a pair of opposing undercut edges (38, 39) for retaining a media holder in said cover member reception part.

9. The contaier according to claim 8 wherein said cover member reception part (10) has a recess (40) with a groove (41) extending through one of the undercut edges.

* * * * *